US012044608B2

(12) United States Patent
Eichmann et al.

(10) Patent No.: US 12,044,608 B2
(45) Date of Patent: Jul. 23, 2024

(54) HOUSING FOR A DETECTION UNIT FOR OPTICALLY DETECTING SMOKE PARTICLES

(71) Applicant: Minimax Viking Research & Development GmbH, Bad Oldesloe (DE)

(72) Inventors: Jens Eichmann, Bad Oldesloe (DE); Carl Dechau, Zarpen (DE); Thorsten Mitzlaff, Bad Oldesloe (DE); Timo Ziegenbein, Mollhagen (DE); Hauke Dittmer, Fehmarn (DE); Dirk Siemer, Rethwisch (DE)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 202 days.

(21) Appl. No.: 17/628,844

(22) PCT Filed: Jul. 31, 2020

(86) PCT No.: PCT/EP2020/071696
§ 371 (c)(1),
(2) Date: Jan. 20, 2022

(87) PCT Pub. No.: WO2021/023666
PCT Pub. Date: Feb. 11, 2021

(65) Prior Publication Data
US 2022/0268681 A1   Aug. 25, 2022

(30) Foreign Application Priority Data
Aug. 5, 2019   (DE) ............... 10 2019 121 063.1

(51) Int. Cl.
*G01N 15/06*   (2024.01)
*G01N 15/00*   (2006.01)
*G01N 15/075*   (2024.01)

(52) U.S. Cl.
CPC ..... *G01N 15/06* (2013.01); *G01N 2015/0046* (2013.01); *G01N 15/075* (2024.01)

(58) Field of Classification Search
CPC .......... G01N 15/06; G01N 2015/0046; G01N 2015/0693; G08B 17/113; G08B 17/107
See application file for complete search history.

(56) References Cited

U.S. PATENT DOCUMENTS 5,400,014 A    3/1995  Behlke et al.
5,546,074 A *  8/1996  Bernal ................ G08B 17/107
                                                       340/630
(Continued)

FOREIGN PATENT DOCUMENTS

DE         3345688       4/1997
DE    20 2014 009 738    7/2007
(Continued)

OTHER PUBLICATIONS

International Search Report, International Application No. PCT/EP2020/071696—German and English translation (published under WO 2021/23666), 12 pages, Nov. 19, 2020.

*Primary Examiner* — Jonathan M Hansen
(74) *Attorney, Agent, or Firm* — Perkins Coie LLP

(57) ABSTRACT

The invention relates to a housing for a detection unit for optically detecting smoke particles. The detection unit has a light source for emitting radiation to be scattered by smoke particles to be detected and a light detector for detecting the scattered radiation. The housing 2 has a cylindrical outer surface 7 having smoke openings 8 through which the smoke particles enter housing 2, and a radially symmetric light-guiding structure 9 with guide members. The guide (Continued)

members are so designed that adjacent guide members each form a guide channel through which the radiation emitted from the light source and not scattered by the smoke particles is guidable to the outside in the direction of the smoke openings 8 by multiple reflection. Higher detection sensitivity for optically detecting smoke particles can be achieved as a result.

16 Claims, 14 Drawing Sheets

(56) References Cited

U.S. PATENT DOCUMENTS

| | | | |
|---|---|---|---|
| 9,569,946 B2* | 2/2017 | Aebersold | G08B 17/107 |
| 2002/0089426 A1* | 7/2002 | Qualey, III | G08B 17/107 |
| | | | 340/630 |
| 2008/0218364 A1* | 9/2008 | Mizuo | G08B 17/113 |
| | | | 340/630 |
| 2014/0168647 A1* | 6/2014 | Ju | G08B 17/107 |
| | | | 29/527.1 |

FOREIGN PATENT DOCUMENTS

| | | |
|---|---|---|
| DE | 20 2015 000 820 | 4/2015 |
| GB | 2 114 286 | 8/1983 |
| JP | H04268697 | 9/1992 |

\* cited by examiner

HOUSING FOR A DETECTION UNIT FOR OPTICALLY DETECTING SMOKE PARTICLES

PRIORITY CLAIM AND INCORPORATION BY REFERENCE

This application is a 35 U.S.C. § 371 application of International Application No. PCT/EP2020/071696, filed Jul. 30, 2020, which claims the benefit of German Application No. 10 2019 121 063.1 filed Aug. 5, 2019, each of which is incorporated by reference in its entirety.

TECHNICAL FIELD

The invention relates to a housing for a detection unit for optically detecting smoke particles. The invention further relates to a smoke detector comprising a detection unit and the housing. The invention also relates to a smoke alarm system comprising the smoke detector and an analyser unit for determining whether smoke particles are present, by analysing radiation detected by the smoke detector.

BACKGROUND AND SUMMARY OF THE INVENTION

Patent specification DE 33 45 688 C2 discloses a scattered light smoke alarm, comprising a light source and a light sensor which is not exposed directly thereto, and which are arranged in a measuring chamber. The measuring chamber is enclosed by a cylindrical side wall which has smoke inlet openings, wherein lamellar diaphragms which extend obliquely inwards at an acute angle to the side wall are arranged behind the smoke inlet openings and form between them bent passages for the smoke that enters and which shield the external light. The inner surface portions of the diaphragms, which are directly exposed to the rays from the light source, are continuously curved from the radially outer ends of the diaphragms towards a measuring chamber axis.

The disadvantage of the scattered light smoke alarm is that the quiescent value, i.e. the intensity of the detected light in the absence of smoke in the measuring chamber, is relatively high, as a result of which the detection sensitivity is reduced.

It is therefore an object of the present invention to provide a housing for a detection unit for optically detecting smoke particles which allows a higher detection sensitivity. Another object of the present invention is to provide a smoke detector comprising a detection unit and the housing, a smoke detection system comprising the smoke detector, and a fire protection system comprising the smoke detection system.

The object is achieved by a housing for a detection unit for optically detecting smoke particles, said detection unit comprising a light source for emitting radiation to be scattered by smoke particles to be detected and a light detector for detecting the scattered radiation, wherein the housing comprises a cylindrical outer surface having smoke openings through which the smoke particles enter the housing and a radially symmetric light-guiding structure having guide members, wherein the guide members are so designed that adjacent guide members each form a guide channel through which the radiation emitted from the light source and not scattered by the smoke particles is guidable to the outside in the direction of the smoke openings by multiple reflection.

Since the housing comprises a radially symmetric light-guiding structure having guide members which are so designed that adjacent guide members each form a guide channel through which the radiation emitted from the light source and not scattered by the smoke particles is guidable by multiple reflection out of the housing in the direction of the smoke openings, the quiescent value, i.e. the intensity of the radiation measured by the light detector when there are no smoke particles in the housing, can be significantly reduced. This, in turn, results in improved detection sensitivity.

The expression "radially symmetric light-guiding structure" relates to the fact that the guide members are all of the same design and can be mapped onto each other by rotating them about the cylinder axis of the cylindrical outer surface.

It is preferred that guide members have tips that point towards a central region of the housing. The tips are preferably pointed edges formed where two side surfaces of the respective guide member touch each other at an acute angle.

In one embodiment, each guide member has a concave side surface and an opposite convex side surface. This allows the light source radiation that is not scattered by the smoke particles to be guided out of the housing, thus resulting in a further improvement in the quiescent value and the detection sensitivity.

The respective concave side surface preferably has a larger radius of curvature than the respective convex side surface. In one embodiment, the guide members are so designed that the convex side surfaces of the respective guide members can each be regarded as subareas of an imaginary first cylinder surface, wherein the innermost points of the imaginary first cylinder surfaces, in relation to the housing, lie on a second imaginary cylinder surface which is centrally arranged inside the housing. The central region towards which the tips of the guide members point can be defined by the second imaginary cylinder surface. In one embodiment, the tips, i.e. the pointed edges, are formed by a roof-like structure having planar surfaces. Two side surfaces of the respective guide member for forming the respective tip preferably meet at an acute angle ranging from 20° to 25°. This acute angle is 22°, in particular. This, too, results in a further improvement in guiding the light source radiation that is not scattered by the smoke particles out of the housing, so that the quiescent value and the detection sensitivity can be further improved.

Each guide member is arranged on a base having an outer side surface which forms part of the cylindrical outer surface, and two further side surfaces adjacent to said outer side surface, each of which faces bases of adjacent guide members, wherein the bases of adjacent guide members are arranged on opposite sides of a smoke opening in such a way that light entering the housing through the smoke opening is guidable out of the housing by multiple reflection. This allows the portion of the radiation that enters the housing from the outside to be reduced, thus resulting in a further improvement in the quiescent value and hence in a further improvement in detection sensitivity. The bases of the guide members are preferably at right angles.

In one embodiment, the guide members have kite members with a kite-shaped cross-section. Each of the kite members preferably has two first side surfaces facing the centre of the housing and two second side surfaces facing the cylindrical outer surface, wherein the first side surfaces of adjacent kite members face each other and wherein the second side surfaces of adjacent kite members face each other, wherein the first side surfaces are concave in shape. These guide members with kite-shape cross-sections also result in a further improvement in guiding the light source radiation that is not scattered by the smoke particles out of the housing, so that the quiescent value and the detection sensitivity can be further improved. In one embodiment, all the side surfaces of the guide members with kite-shaped cross-sections are concave in shape. The kite-shaped cross-section is preferably based on a kite or deltoid, i.e. a planar quadrilateral that has two pairs of equal-length sides that are adjacent to each other, whereby the planar quadrilateral has been deformed such that the sides are concavely curved.

It is preferred that the light-guiding structure has roof-like members between the cylindrical outer surface and the kite members, each roof-like member comprising two side surfaces facing the second side surfaces of the kite members, wherein a first side surface of the respective roof member faces a second side surface of a kite member and a second side surface of the same roof member faces a second side surface of another kite member, such that a channel is formed between said side surfaces which leads from one smoke opening to an adjacent smoke opening, so that light entering from the outside through a smoke opening is guidable back outside again. This reduces the radiation entering the housing from the outside and thus results in a further reduction of the quiescent value, which in turn can further increase the detection sensitivity.

It is also preferred that the cylindrical outer surface circularly encloses a closure portion of the housing, wherein a radially symmetric cone member is centrally arranged on the inner side of the closure section. The radiation falling on the inner side of the closure section is thus reflected to the side wall of the housing, in which the smoke openings through which the radiation can leave the housing are located. This results in a further reduction in the quiescent value and thus in a further increase in detection sensitivity. The radially symmetric cone member is preferably designed in such a way that it does not protrude into the region of the unscattered radiation emitted from the light source or into a field of vision of the light detector. The result, in particular, is that the radially symmetric cone member does not reflect radiation emitted from the light source into the light detector, thus allowing the detection sensitivity to be further improved.

It is also preferred that the cylindrical outer surface circularly encloses a closure portion of the housing, wherein the closure section comprises an inwardly, radially symmetrically curved region. It is further preferred that the inwardly, radially symmetrically curved region matches an outer surface of a spherical segment. By means of the inwardly curved region, radiation that falls on the inner side of the closure section can also be reflected towards the smoke openings in the side wall of the housing, with the result that the quiescent value can be further reduced, and hence that the detection sensitivity can be further increased.

It is also preferred that the housing has detent members in order to connect the housing to the detection unit. The detent members allow the housing to be easily connected to a detection unit. In particular, a housing can easily be replaced by a different housing by means of the detent members.

It is also preferred that the housing is designed at least partly as an injection-moulded part. This can result in simplified and at the same time very precise production of the housing.

The aforementioned object is also achieved by a smoke detector, the smoke detector comprising:
a detection unit for optically detecting smoke particles, said detection unit comprising a light source for emitting radiation to be scattered by smoke particles to be detected and a light detector for detecting the scattered radiation, wherein the beam path of the radiation emitted from the light source and a field of vision of the light detector, within which the light detector can detect scattered radiation, form an intersection volume located outside a plane in which the light source and the light detector are arranged, and
a housing according to any one of the disclosed embodiments, wherein the detection unit and the housing are so designed that the housing encloses the intersection volume, wherein the light-guiding structure does not protrude into the intersection volume.

The aforementioned object is also achieved by a smoke detection system comprising:
a smoke detector according to any one of the disclosed embodiments,
an analyser unit for determining whether smoke particles are present, by analysing the detected radiation.

The aforementioned object is also achieved by a fire protection system comprising a smoke detection system according to any one of the disclosed embodiments.

It should be understood that the housing according to any one of the disclosed embodiments, the smoke detector according to any one of the disclosed embodiments and the fire protection system according to any one of the disclosed embodiments have similar or identical preferred embodiment. as defined in particular with respect to each of the preferred embodiments of the housing.

BRIEF DESCRIPTION OF THE DRAWINGS

Embodiments of the invention shall now be described with reference to the following Figures, in which.

MODES(S) FOR CARRYING OUT THE INVENTION

Figure 1:
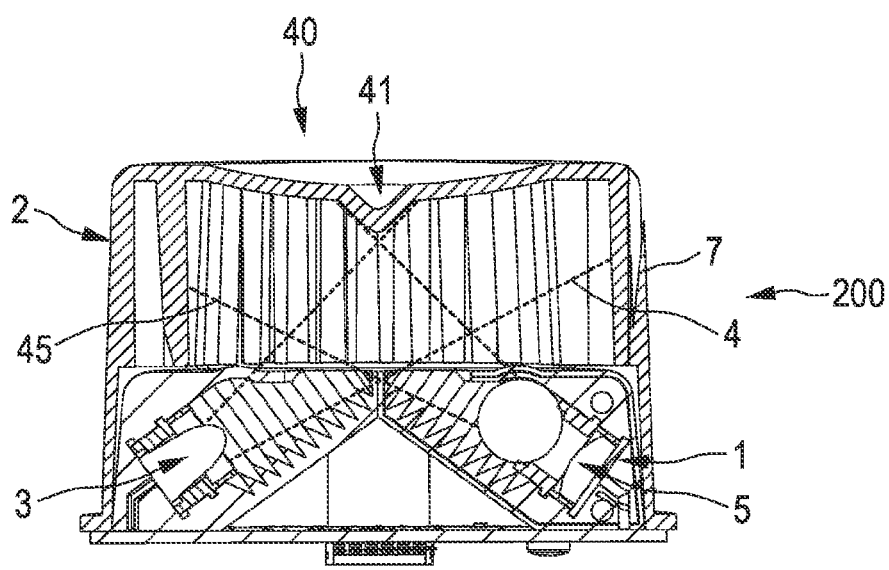
FIG. 1 shows an embodiment of a smoke detector, in schematic form and by way of example.

FIG. 1 shows an embodiment of a smoke detector, in schematic form and by way of example. Smoke detector 200 comprises a detection unit 1 and a housing 2, detection unit 1 being adapted to detect smoke particles optically. Detection unit 1 comprises a light source 3 for emitting radiation 4 to be scattered by smoke particles, and a light detector 5 for detecting the scattered radiation 4, wherein the beam path of the unscattered radiation 4 emitted from light source 3, and a field of vision 45 of light detector 5, form an intersection volume located outside a plane in which light source 3 and light detector 5 are arranged. Detection unit 1 and housing 2 are designed in such a way that housing 2 encloses the intersection volume.

Figure 2:
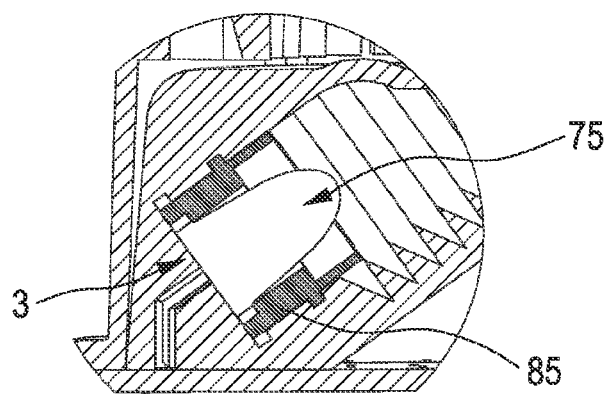
FIG. 2 shows an embodiment of a light source, in schematic form and by way of example.
Figure 3:
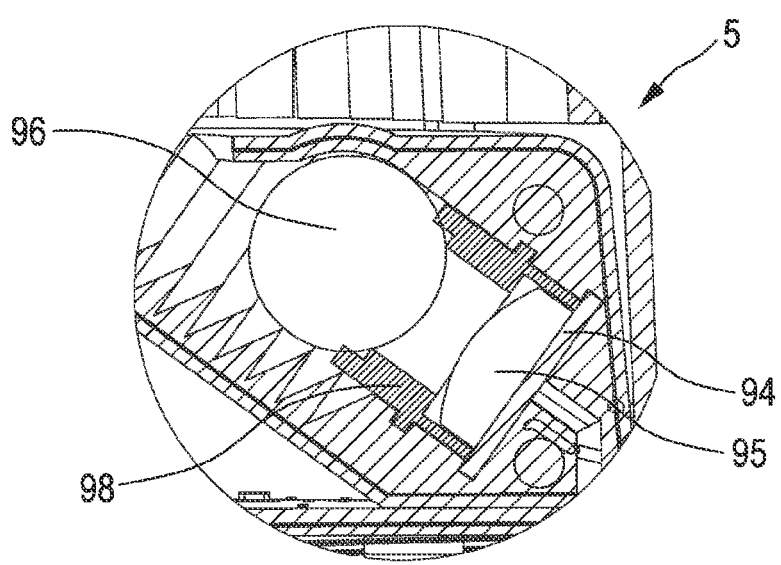
FIG. 3 shows a light detector of the detection unit of the smoke detector, in schematic form and by way of example.

FIG. 2 shows, by way of example and in schematic form, an embodiment of light source 3, which in this example comprises a light-emitting diode 75 which is arranged in a holder 85. The light source may also be designed differently, of course. FIG. 3 shows, in schematic form and by way of example, an embodiment of light detector 5. In this example, light detector 5 includes a focusing member 96, such as a glass sphere, a receiver element 95, such as a photodiode, a holder 98 for focusing member 96, and a support plate 94 for receiver element 95. In another embodiment, the light detector may also be designed differently, of course.

Figure 4:
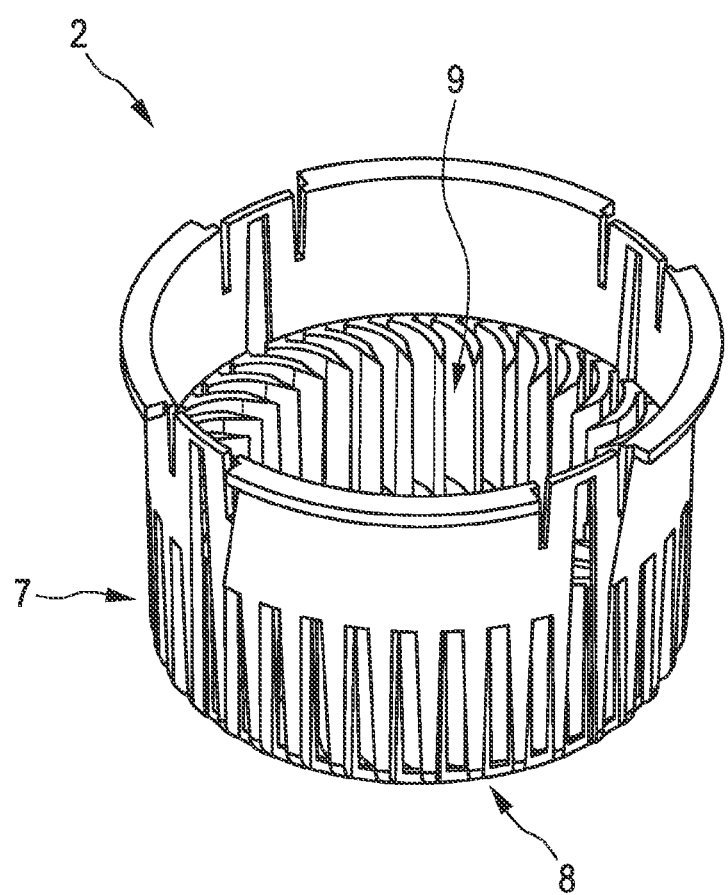
FIG. 4 shows an oblique top view of a first embodiment of a housing of the smoke detector, in schematic form and by way of example.

Housing 2 comprises a light-guiding structure 9, shown schematically and by way of example in FIG. 4, detection unit 1 and housing 2 being so designed that light-guiding structure 9 does not protrude into the intersection volume formed by the beam path of the unscattered radiation 4 emitted from light source 3 and the field of vision 45 of light detector 5.

Figure 6:
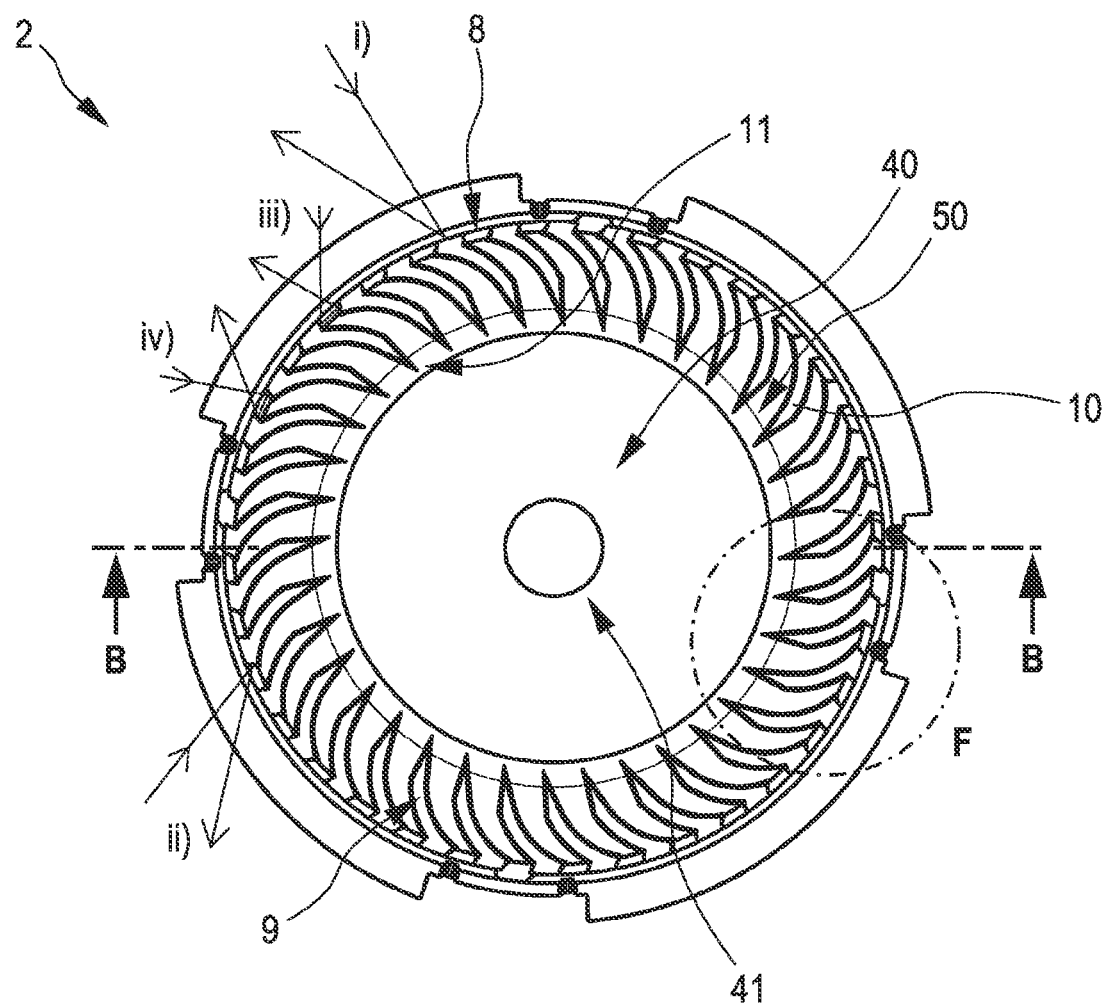
FIG. 6 shows another view of the housing, in schematic form and by way of example.
Figure 7:
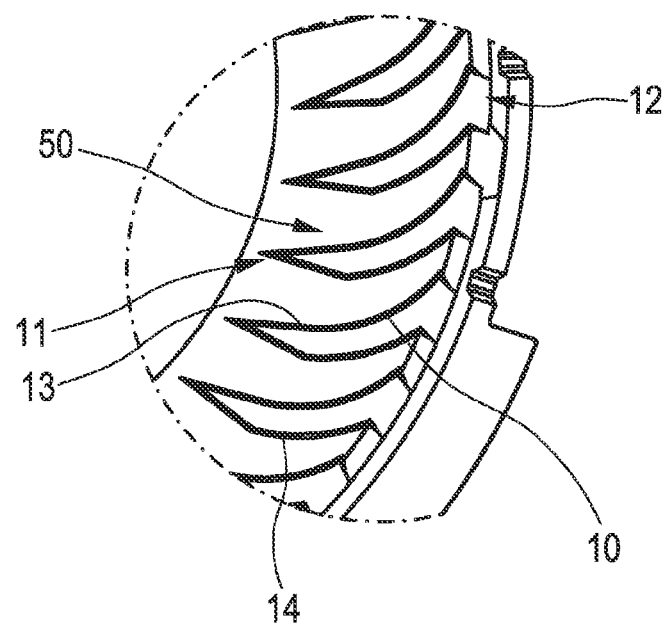
FIG. 7 shows an enlarged view of a region marked with a circle F in FIG. 6.

Housing 2 also comprises a cylindrical outer surface 7 having smoke openings 8 through which the smoke particles enter housing 2. Light-guiding structure 9 is radially symmetric and comprises guide members 10, which are shown schematically and by way of example in FIGS. 5 to 7. Guide members 10 are so designed that adjacent guide members 10 each form a guide channel 50 through which the radiation 4 emitted from light source 3 and not scattered by the smoke particles is guidable to the outside in the direction of smoke openings 8 by multiple reflection. Guide members 10 have tips 11 that point towards a central region 18 of housing 2, each guide member 10 having a concave side surface 13 and an opposite convex side surface 14. Each guide member 10 is arranged on a base 12 having an outer side surface which form part of cylindrical outer surface 7, and two further side surfaces adjacent to said outer side surface, each of which faces bases 12 of adjacent guide members 10. The bases 12 of adjacent guide members 10 are arranged on opposite sides of a smoke opening 8 in such a way that light entering the housing through smoke opening 8 is guidable out of the housing by multiple reflection. The concave side surface 13 of the respective guide member 10 has a larger radius of curvature than the convex side surface 14 of the respective guide member 10.

Figure 5:
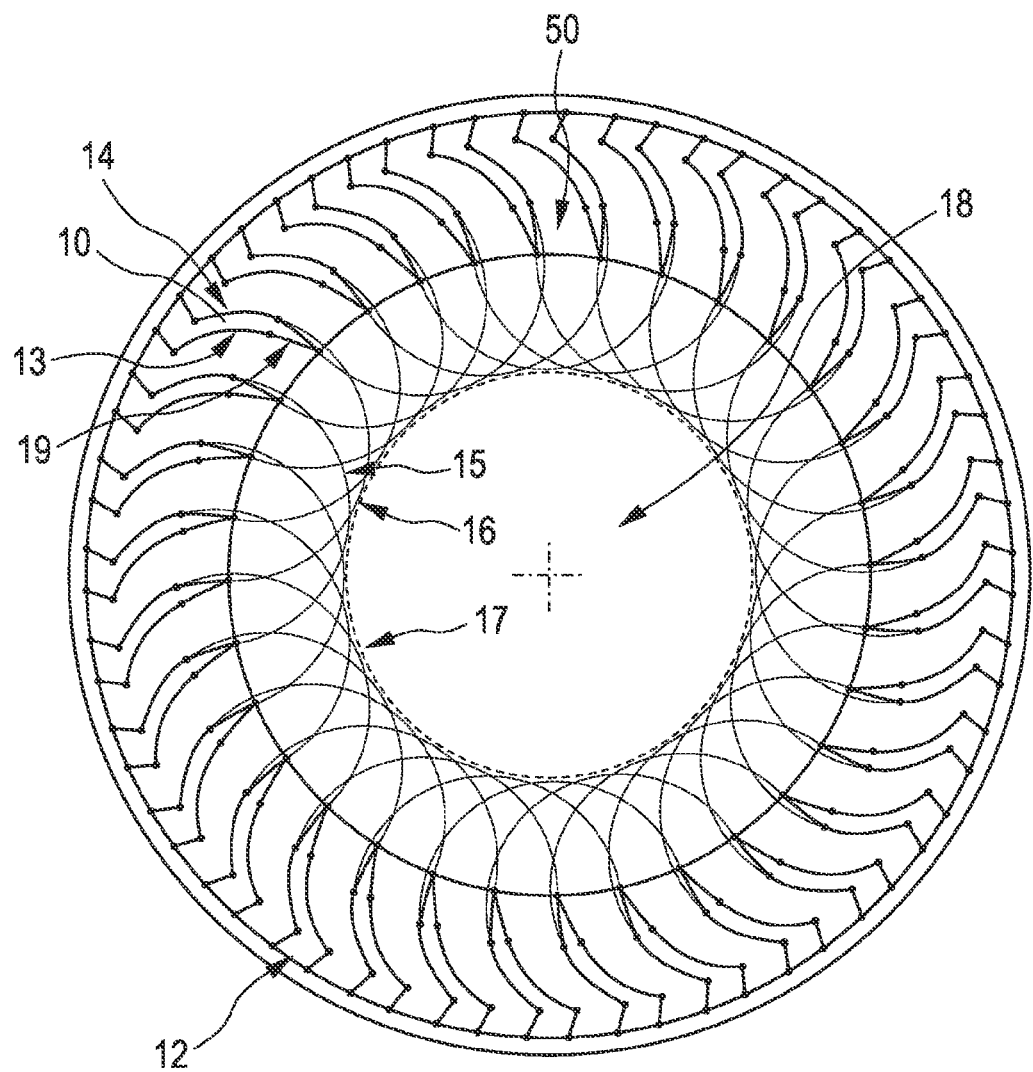
FIG. 5 illustrates first and second imaginary cylinder surfaces of the housing.

In one preferred embodiment illustrated schematically and by way of example in FIG. 5, the guide members are so designed that the convex side surfaces 14 of the respective guide members 10 can each be regarded as subareas of an imaginary first cylinder surface 15, wherein the innermost points 16 of the imaginary first cylinder surfaces 15, in relation to the housing, lie on a second imaginary cylinder surface 17 which is centrally arranged inside housing 2. In this example, the second imaginary cylinder surface 17 defines the central region 18 into which the tips 11 of guide members 10 point. It should be noted that FIG. 5 is merely intended to illustrate the imaginary first and second cylinder surfaces 15, 17, and does not show all the features of the housing. For example, smoke openings 8 are not shown in FIG. 5, even though housing 2 has these, of course. Attention is also drawn to the fact that, although FIGS. 6 to 9 have certain dimensions, these are mentioned here only by way of example, and the housing may, of course, have other dimensions.

The tips 11 of guide members 10 may be formed by a roof-like structure 19 with planar surfaces. The tips 11 of guide members 10 preferably enclose an angle in a range from 20° to 25° and in particular enclose an angle of 22°.

Figure 8:
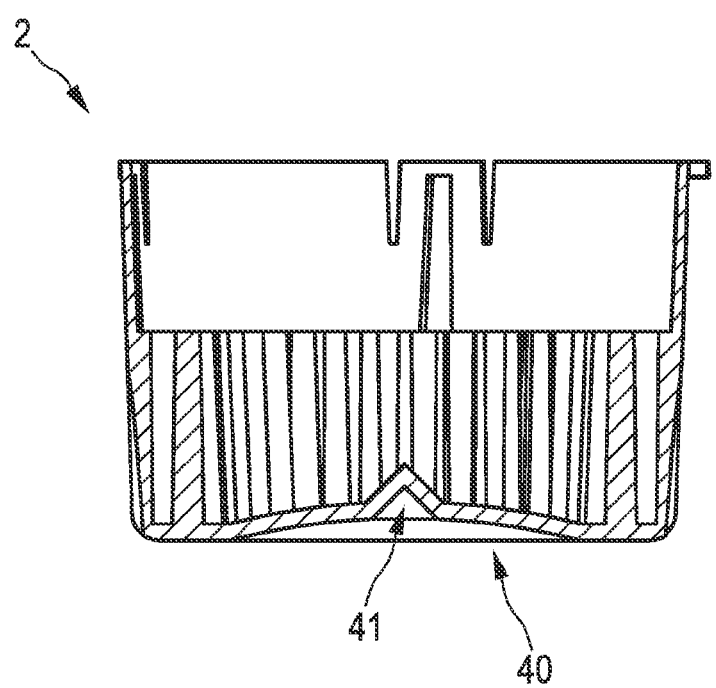
FIG. 8 shows a cross-section through the housing shown in FIG. 6, along line B-B.
Figure 9:
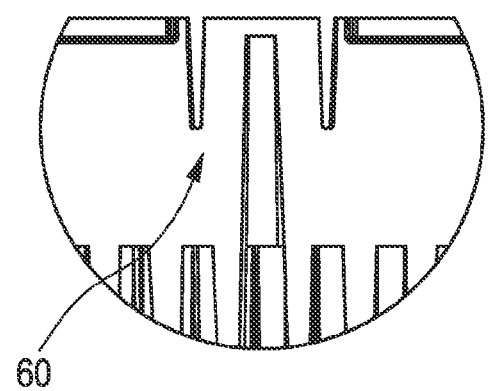
FIG. 9 shows a detent member of the housing, in schematic form and by way of example.
Figure 10:
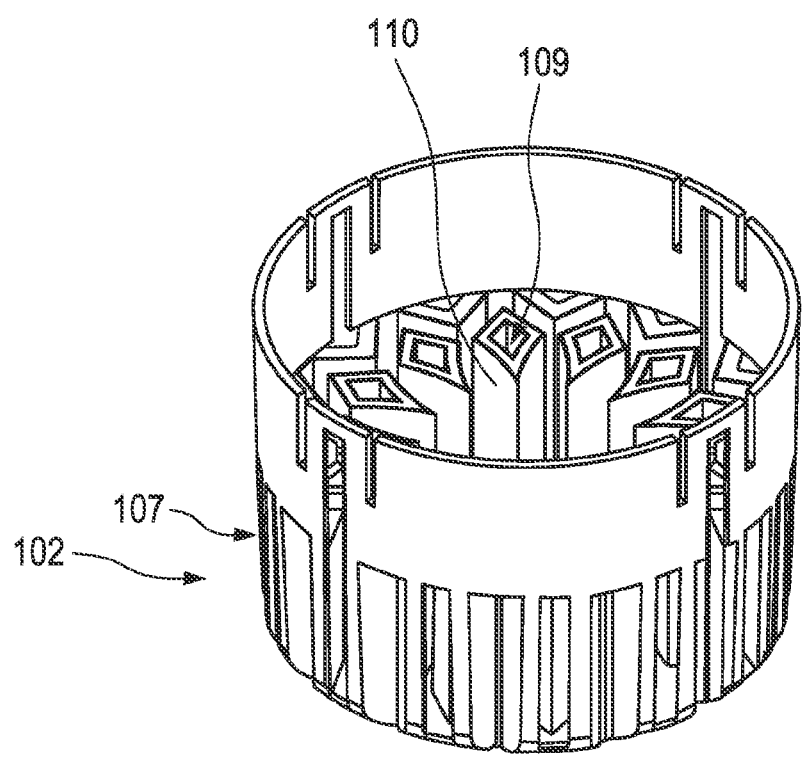
FIG. 10 shows an oblique top view of another embodiment of a housing for the smoke detector, in schematic form and by way of example.
Figure 11:
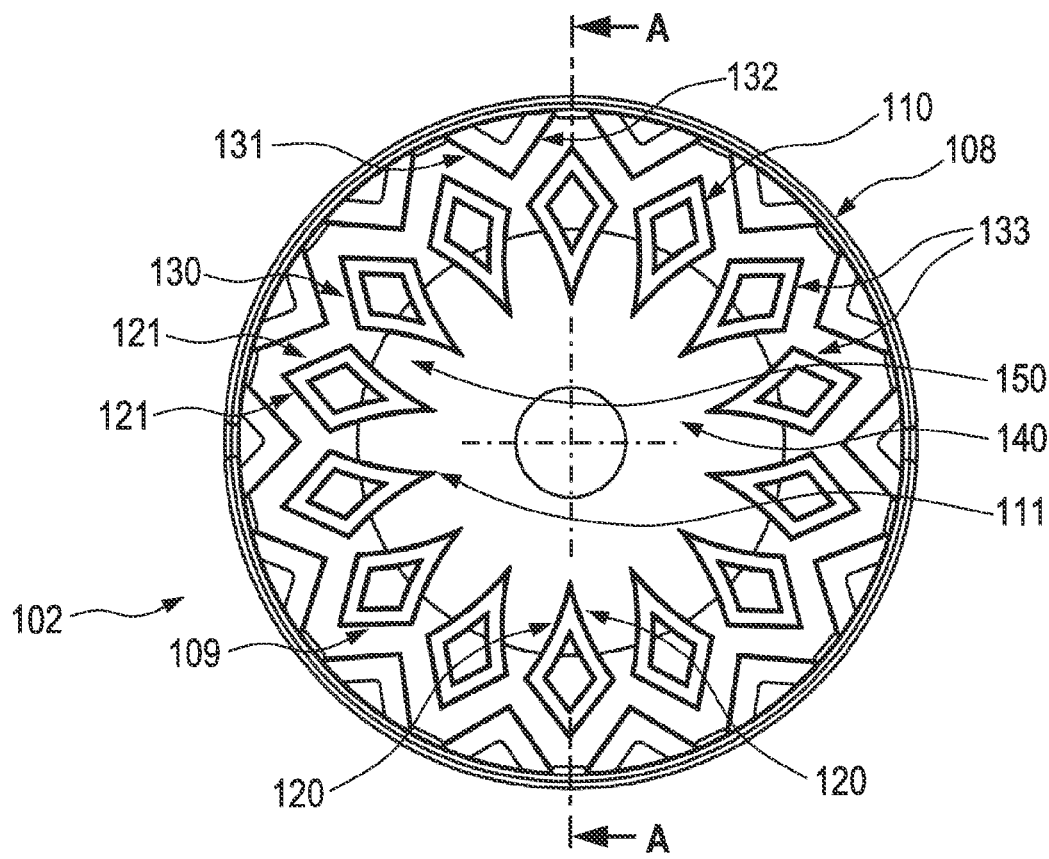
FIG. 11 shows a view into the interior of the housing, in schematic form and by way of example.
Figure 12:
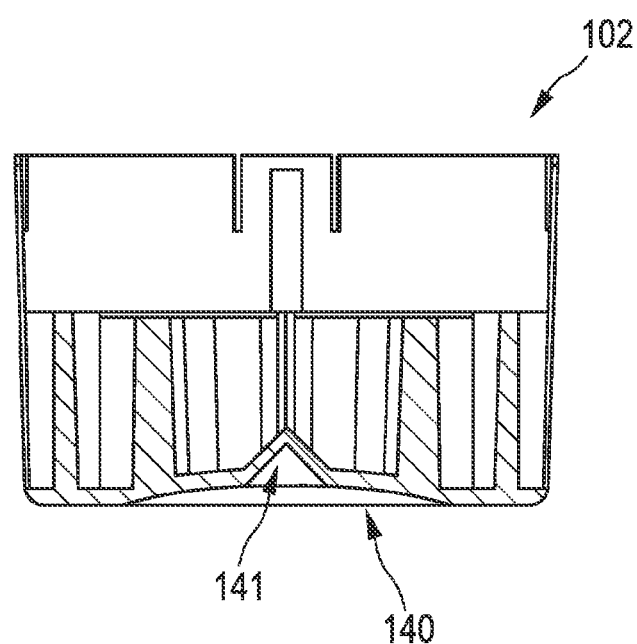
FIG. 12 shows a view of the housing along line A-A in FIG. 11, in schematic form and by way of example.
Figure 13:
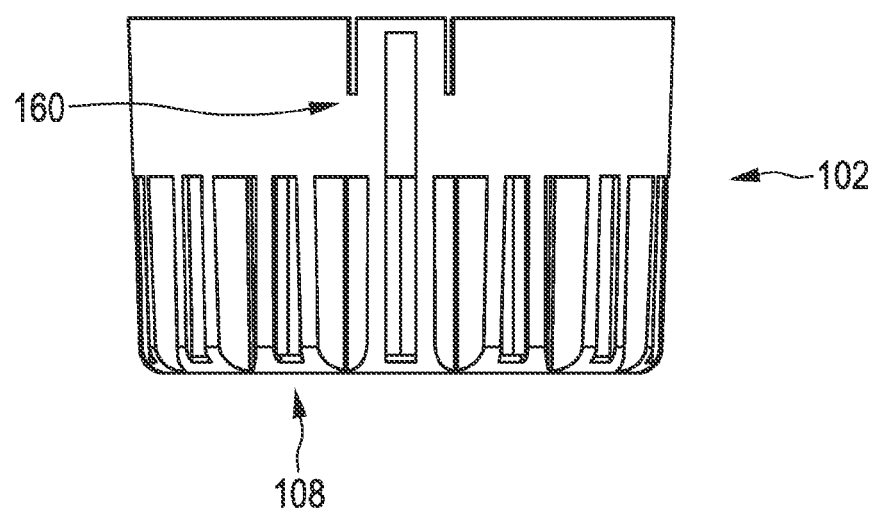
FIG. 13 shows a detent member of the housing, in schematic form and by way of example.

As is illustrated in FIGS. 1 and 8, in particular, cylindrical outer surface 7 circularly encloses a closure section 40, wherein a radially symmetric cone member 41 is centrally arranged on the inner side of closure section 40. The radially symmetric cone member 41 is so designed that it does not protrude into the region of the unscattered radiation 4 emitted from light source 3 or into a field of vision 45 of light detector 5. Closure section 40 also includes an inwardly radially symmetrically curved region that preferably matches an outer surface of a spherical segment. Housing 2 also includes detent members 60 for connecting housing 2 to detection unit 2, which has corresponding detent members. Detent members 60 are shown schematically and by way of example in FIG. 9.

FIGS. 10 to 13 illustrate by way of example and in schematic form another embodiment of a housing for detection unit 1. In this embodiment also, housing 102 comprises a cylindrical outer surface 107 having smoke openings 108 through which the smoke particles enter housing 102, and a radially symmetric light-guiding structure 109 with guide members 110. In this embodiment also, guide members 110 are so designed that adjacent guide members 110 each form a guide channel 150 through which the radiation 4 emitted from the light source 3 and not scattered by the smoke particles is guidable to the outside in the direction of the smoke openings 108 by multiple reflection.

In this embodiment, however, guide members are formed by kite members 110 with a kite-shaped cross-section. Guide members 110 with the kite-shaped cross-section each has first side surfaces 120 facing the centre of housing 102 and two second surfaces 121 facing cylindrical outer surface 107. The first side surfaces 120 of adjacent guide members 110 face each other, and the second side surfaces 121 of adjacent guide members 110 also face each other, wherein the first side surfaces 120, and optionally the second side surfaces 121 also, are concave in shape.

In this embodiment, the light-guiding structure 109 has roof-like members 130 between the cylindrical outer surface 107 and the guide members 110, each comprising two side surfaces 131, 132 facing the second side surfaces 121 of the guide members 110, wherein a first side surface 131 of the respective roof member 130 faces a second side surface 121 of a guide member 110 and a second side surface 130 of the same roof member 130 faces a second side surface 121 of another guide member 110, such that a channel 133 is formed between said side surfaces which leads from one smoke opening 108 to an adjacent smoke opening 108, so that light entering from the outside through a smoke opening 108 can be guided back outside again.

In this embodiment also, the housing includes a closure section 140 which is circularly enclosed by cylindrical outer surface 107, wherein a radially symmetric cone member 141 is centrally arranged on the inner side of closure section 140. The radially symmetric cone member 141 is so designed that it does not protrude into the region of the unscattered radiation 4 emitted from the light source 3 or into a field of vision 45 of light detector 5. Closure section 140 also includes an inwardly radially symmetrically curved region that preferably matches an outer surface of a spherical segment.

Housings 2, 21 are preferably designed completely or at least partly as injection-moulded parts.

Figure 14:
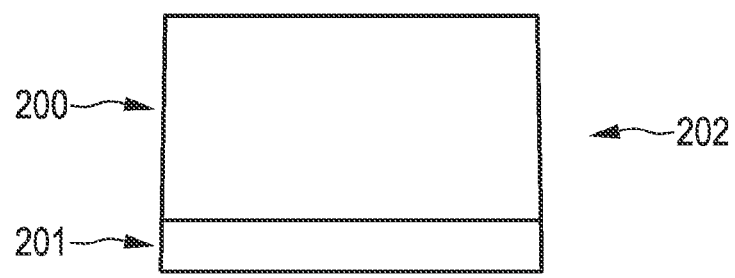
FIG. 14 shows a smoke detection system comprising the smoke detector and an analyser unit, in schematic form and by way of example.

FIG. 14 shows, by way of example and in schematic form, a smoke detection system 202 comprising smoke detector 200 and an analyser unit 201 for determining whether smoke particles are present, by analysing the radiation detected by light detector 5. Analyser unit 201 may be integrated in smoke detector 200. However, it may also be a separate unit which is connected to smoke detector 200 via a wired or wireless data link. Smoke detection system 202 may be part of a fire protection system. The smoke detection system may also include an intake system that sucks in smoke particles and feeds them to the smoke detector.

The housing may also be conceived of as an optical sump or optical pot. As noted above, the housing is preferably designed as an injection-moulded component, so that it can be produced in as technically simple a manner as possible. The optical sump, i.e. the housing, preferably forms an enclosed space, sealed from view, while at the same time having as low a flow resistance as possible for the smoke entering the housing. In order to achieve a high detection sensitivity to smoke particles entering the housing, the housing is so designed that the radiant power at the receiver is as low as possible in the absence of smoke and as high as possible when smoke enters. If there are no smoke particles inside the housing, the light intensity detected by light detector 5 should thus be as low as possible, and when smoke particles enter the housing the radiation scattered by the smoke particles should result in the intensities detected at light detector 5 being as high as possible. The detent members also allow the housing, which could also be conceived of as a smoke detector insert, to be installed relatively easily. The radially symmetric geometry and the flow-optimised design can also result in simpler installation in a smoke intake system, because there is no predefined installation direction and the same flow conditions are present at different installation positions.

The radiation emitted from the transmitter, i.e. from light source 3, is directed to the outside, due to the geometry of the optical sump, that is, by the guide members in particular, in order to thus prevent multiple reflections inside the housing and thus radiation falling on light detector 5. Ideally, there would only be one primary lobe, and if the smoke particles enter this primary radiation lobe they scatter the radiation, and the scattered radiation is detected by the light detector.

Due to the inner shape of the optical sump, i.e. of the housing, a measuring chamber almost sealed from view is formed, inside which the smoke particles can be detected. To that end, the housing preferably has geometries, i.e. the light-guiding structures in particular, which prevent a direct view into the interior and which reflect any radiation entering from the outside back outside again in a directed manner.

Due to the radially symmetric structure of the optical sump, it can be mounted in a positionally independent manner onto the transmitter/receiver unit, i.e. onto detection unit 1. Due to the radially symmetric structure, it is also possible to ensure a flow resistance that is directionally independent, so that any installation direction can be used inside a smoke intake system, for example. Installing the optical sump is also relatively simple, due to the detent members. It is not necessary, for example, to solder metal tabs onto anything. The guide structure inside the housing is also designed in such a way that there is no reduction in the detection volume within which smoke particles can be detected.

The guide members 10 described above, for example with reference to FIGS. 5 to 7, could also be conceived of as curved, crescent-shaped fins arranged radially symmetrically in the optical sump, i.e. in the housing. The tip of each fin points into a central region of the optical sump, in particular to the centre of the optical sump, thus minimising the size of the perpendicular surface seen by the transmitter, i.e. by light source 3. The two curved surfaces of a fin may each match cylindrical surfaces, wherein the radii of these two cylindrical surfaces may be so designed relative to each other that when the angle of adjacent fins to each other is taken into account, radiation which is incident at any suitable angle is guided out of the optical sump by multiple reflection. Each fin is arranged on a base which is so designed that the optical sump has a circular outer contour. The base may have a plurality of reflective surfaces and be so designed that a) radiation from the outside does not enter the optical sump at all when the radiation falls on the surface forming the outer contour of the optical sump (see, for example, beam path (i) in FIG. 6), and b) radiation that falls on a reflecting surface of a base is reflected back out of the optical sump (see, for example, beam path (ii) in FIG. 6), and c) radiation that falls on a reflecting surface of a base which faces a reflecting surface of an adjacent base is directed onto the reflecting surface of the adjacent base, from which the radiation is guided back out of the optical sump (see, for example, beam paths (iii) and (iv) in FIG. 6). Because of option b), in particular, which is shown by way of example with beam path ii), the reflecting surfaces of the respective base which face the reflecting surfaces of the adjacent bases are tilted. These reflecting surfaces preferably do not extend exactly in the direction of the radius, but are tilted in relation to the radius.

In the embodiment described above with reference to FIGS. 10 to 13, the optical sump, i.e. housing 102, also includes radially symmetric guide members, which in this example are reflectors with kite-shaped cross-sections, the side surfaces of the reflectors preferably being curved. For that reason, the kite-shaped cross-section preferably does not include any straight sides, but sides which are correspondingly curved. The cross-section is therefore kite-shaped, although the cross-section is not a perfect kite shape.

These reflectors, i.e. these guide members, have two longer sides and two shorter sides, at least the two longer sides being curved so that radiation falling at any suitable angle onto one of the longer sides is guided out by multiple reflection between adjacent guide members. The distance between the guide members, i.e. between the reflectors in relation to each other, and the angle between the short sides of the guide members are preferably chosen such that the multiply reflected radiation exits the optical sump directly, or is guided out of the optical sump via further reflections at the shorter sides. The tips of the reflectors, i.e. of guide members 110, are preferably oriented towards the centre of the optical sump in order to provide the primary lobe of the radiation emitted from the light source a perpendicular reflecting surface that is as small as possible. The shorter sides of the guide members with kite-shaped cross-sections are so designed, preferably, that the radiation entering from the outside is guided by reflection back out of the optical sump via these short sides and the triangular contours framing them from the outside, i.e. the kite members. Together with the guide members with the kite-shape cross-sections, the outer triangular contour, i.e. the roof members, form a substantially opaque optical sump that could also be conceived of as an optical pot, as noted above.

The conical/spherical segment geometry integrated at the inner top side of the housing directs the portions of radiation that fall onto the inner side of the lid to the side surfaces of the optical sump, where they can leave the measuring chamber. The cone preferably has such a geometry that the overlap between the viewing window of the receiver, i.e. of the light detector, and the primary radiation lobe is not restricted. Due to the spherical shape of the inner side of the closure section, other portions of radiation that fall onto this inner side are deflected to the side surface. This closure section geometry is also radially symmetric, so any manner of installation is possible.

Although specific dimensions are shown in some of the above embodiments, the guide structure may also have other dimensions and may also be designed differently. For example, the fin geometry and/or the kite geometry may also be stretched if the outer diameter of the housing is made larger. The top side of the housing may also be designed as a hollow sphere or only as a cone or similar, if the height of the house is not limited, although in these cases as well, the detection volume that is defined by the intersection volume described above should not be limited, or only barely limited.

Analyser unit 201 may be adapted to detect that smoke particles are present when the detected intensity of radiation exceeds a predefined threshold. The smoke detection system preferably includes an output unit which in this case reports the detection of smoke particles to an alarm unit and/or a fire extinguishing device.

Although the closure section which is circularly enclosed by the cylindrical outer surface has a specific outer shape in the embodiments described above, the closure section may also have a different outer shape. For example, the outer surface of the closure section may also be flat, i.e. planar.

In the claims, the words "comprise" and "include" do not exclude other elements or steps, and the indefinite article "a/an" does not exclude a plurality.

A single unit or device may perform the functions of several elements mentioned in the claims. The fact that individual functions and elements are mentioned in different dependent claims does not mean that a combination of these functions or elements could not also be used to advantage.

The reference signs in the claims are not to be understood as meaning that the subject-matter and the extent of protection conferred by the claims is limited by these reference signs.

LIST OF UTILIZED REFERENCE SIGNS

1 Detection unit
2, 102 Housing
3 Light source of the detection unit
4 Radiation from the light source
5 Light detector of the detection unit
7, 107 Cylindrical outer surface
8, 108 Smoke openings
9, 109 Radially symmetric light-guiding structure
10 Guide members (fins) of the light-guiding structure
11 Tips of the guide members (fins)
12 Base of a guide member (fin)
13 Concave side surface of a guide member (fin)
14 Convex side surface of a guide member (fin)
15 Imaginary first cylinder surface
16 Innermost point of the first imaginary cylinder surface
17 Imaginary second cylinder surface
18 Central region
19 Roof-like structure
40,140 Closure section of the housing
41,141 Radially symmetric cone member on the inner side of the closure section
45 Field of vision of the detection unit
50 Guide channel between adjacent guide members (fins)
60,160 Detent members for connecting the housing to the detection unit
75 Transmitter element (LED)
85 Holder
94 Support plate for the receiver element
95 Receiver element (photodiode)
96 Focusing member (glass sphere)
98 Holder
110 Guide members (kite-shaped members) of the light-guiding structure
111 Tips of the guide members (kite-shaped members)
120 First side surfaces of the kite-shaped members
121 Second side surfaces of the kite-shaped members
130 Roof member
131 First side surface of a roof member
132 Second side surface of a roof member
133 Channel between roof members and kite-shaped members
150 Guide channel between adjacent guide members (kite-shaped members)
200 Smoke detector
201 Analyser unit
202 Smoke detection system
300 Fire protection system
310 Protected area
320 Control unit
330 Extinguishing agent supply unit
340 Extinguisher unit

The invention claimed is:

1. A housing for a detection unit for optically detecting smoke particles, said detection unit comprising a light source for emitting radiation to be scattered by smoke particles to be detected and a light detector for detecting the scattered radiation, wherein the housing comprises a cylindrical outer surface having smoke openings through which the smoke particles enter the housing and a radially symmetric light-guiding structure having guide members, wherein the guide members are so designed that adjacent guide members each form a guide channel through which the radiation emitted from the light source and not scattered by the smoke particles is guidable to the outside in a direction of the smoke openings by multiple reflection, wherein the guide members have tips that point towards a central region of the housing, wherein each guide member has a concave side surface and an opposite convex side surface; and wherein each guide member is arranged on a base having an outer side surface which forms part of the cylindrical outer surface and two further side surfaces adjacent to said outer side surface, each of which faces bases of adjacent guide members, wherein the bases of adjacent guide members are arranged on opposite sides of one of the smoke openings in such a way that light entering the housing through the one of the smoke openings is guidable out of the housing by the multiple reflection.

2. A housing for a detection unit for optically detecting smoke particles, said detection unit comprising a light source for emitting radiation to be scattered by smoke particles to be detected and a light detector for detecting the scattered radiation, wherein the housing comprises a cylindrical outer surface having smoke openings through which the smoke particles enter the housing and a radially symmetric light-guiding structure having guide members, wherein the guide members are so designed that adjacent guide members each form a guide channel through which the radiation emitted from the light source and not scattered by the smoke particles is guidable to the outside in a direction of the smoke openings by multiple reflection, wherein the guide members have tips that point towards a central region of the housing, wherein each guide member has a concave side surface and an opposite convex side surface, and wherein the concave side surface has a larger radius of curvature than the convex side surface.

3. A housing for a detection unit for optically detecting smoke particles, said detection unit comprising a light source for emitting radiation to be scattered by smoke particles to be detected and a light detector for detecting the scattered radiation, wherein the housing comprises a cylindrical outer surface having smoke openings through which the smoke particles enter the housing and a radially symmetric light-guiding structure having guide members, wherein the guide members are so designed that adjacent guide members each form a guide channel through which the radiation emitted from the light source and not scattered by the smoke particles is guidable to the outside in a direction of the smoke openings by multiple reflection, wherein the guide members have tips that point towards a central region of the housing, wherein each guide member has a concave side surface and an opposite convex side surface, and wherein the guide members are so designed that the convex side surfaces of the respective guide members can each be regarded as subareas of an imaginary first cylinder surface, wherein the innermost points of the imaginary first cylinder surfaces, in relation to the housing, lie on a second imaginary cylinder surface which is centrally arranged inside the housing.

4. The housing according to claim 3, wherein the central region is defined by the second imaginary cylinder surface.

5. A housing for a detection unit for optically detecting smoke particles, said detection unit comprising a light source for emitting radiation to be scattered by smoke particles to be detected and a light detector for detecting the scattered radiation, wherein the housing comprises a cylindrical outer surface having smoke openings through which the smoke particles enter the housing and a radially symmetric light-guiding structure having guide members, wherein the guide members are so designed that adjacent guide members each form a guide channel through which the radiation emitted from the light source and not scattered by the smoke particles is guidable to the outside in a direction of the smoke openings by multiple reflection, wherein the guide members have tips that point towards a central region of the housing, and wherein the tips of the guide members enclose an angle in a range from 20° to 25°.

6. A housing for a detection unit for optically detecting smoke particles, said detection unit comprising a light source for emitting radiation to be scattered by smoke particles to be detected and a light detector for detecting the scattered radiation, wherein the housing comprises a cylindrical outer surface having smoke openings through which the smoke particles enter the housing and a radially symmetric light-guiding structure having guide members, wherein the guide members are so designed that adjacent guide members each form a guide channel through which the radiation emitted from the light source and not scattered by the smoke particles is guidable to the outside in a direction of the smoke openings by multiple reflection, and wherein the guide members have kite members with a kite-shaped cross-section; wherein the kite members each have two first side surfaces facing the centre of the housing and two second side surfaces facing the cylindrical outer surface, wherein the first side surfaces of adjacent kite members face each other and wherein the second side surfaces of adjacent kite members face each other, wherein the first side surfaces are concave in shape.

7. The housing according to claim 6, wherein the light-guiding structure has roof-like members between the cylindrical outer surface and the kite members, each comprising two side surfaces facing the second side surfaces of the kite members, wherein a first side surface of the respective roof member faces a second side surface of a kite member and a second side surface of the same roof member faces a second side surface of another kite member, such that a channel is formed between said side surfaces which leads from one smoke opening to an adjacent smoke opening, so that light entering from the outside through a smoke opening is guidable back outside again.

8. A housing for a detection unit for optically detecting smoke particles, said detection unit comprising a light source for emitting radiation to be scattered by smoke particles to be detected and a light detector for detecting the scattered radiation, wherein the housing comprises a cylindrical outer surface having smoke openings through which the smoke particles enter the housing and a radially symmetric light-guiding structure having guide members, wherein the guide members are so designed that adjacent guide members each form a guide channel through which the radiation emitted from the light source and not scattered by the smoke particles is guidable to the outside in a direction of the smoke openings by multiple reflection, wherein the cylindrical outer surface circularly encloses a closure section of the housing, and wherein a radially symmetric cone member is centrally arranged on the inner side of the closure section.

9. The housing according to claim 8, wherein the radially symmetric cone member is so designed that it does not protrude into the region of the unscattered radiation emitted from the light source or into a field of vision of the light detector.

10. The housing according to claim 8, wherein the cylindrical outer surface circularly encloses a closure section of the housing, and wherein the closure section comprises an inwardly, radially symmetrically curved region.

11. The housing according to claim 10, wherein the inwardly, radially symmetrically curved region matches an outer surface of a spherical segment.

12. The housing according to claim 5, wherein the housing is designed at least partly as an injection-moulded part.

13. A smoke detector comprising:
   a detection unit for optically detecting smoke particles, said detection unit comprising a light source for emitting radiation to be scattered by smoke particles to be detected and a light detector for detecting the scattered radiation, wherein the beam path of the radiation emitted from the light source and a field of vision of the light detector, within which the light detector can detect scattered radiation, form an intersection volume located outside a plane in which the light source and the light detector are arranged, and
   a housing according to claim 5, wherein the detection unit and the housing are so designed that the housing encloses the intersection volume, wherein the light-guiding structure does not protrude into the intersection volume.

14. A smoke detection system comprising:
a smoke detector according to claim 13,
an analyser unit for determining whether smoke particles are present, by analysing the detected radiation.

15. The housing according to claim 5, wherein each guide member has a concave side surface and an opposite convex side surface.

16. The housing according to claim 15, wherein the tips are formed by a roof-like structure having planar surfaces.

* * * * *